United States Patent
Kaishita et al.

[15] 3,679,140
[45] July 25, 1972

[54] ICE SHAVER

[72] Inventors: Yoshiaki Kaishita, Nara; Shigeo Sugimoto, Osaka, both of Japan

[73] Assignee: Tiger Vacuum Bottle Industrial Company, Limited, Osaka Prefecture, Japan

[22] Filed: July 9, 1970

[21] Appl. No.: 53,380

[30] Foreign Application Priority Data

July 10, 1969 Japan...................................44/65613
July 21, 1969 Japan...................................44/57856

[52] U.S. Cl. ..........................241/95, 241/DIG. 17, 146/165
[51] Int. Cl. .....................................................B02c 19/00
[58] Field of Search..............241/95, 168, 274, 276, DIG. 17; 146/113, 125, 164, 165

[56] References Cited

UNITED STATES PATENTS

| | | | |
|---|---|---|---|
| 685,517 | 10/1901 | Lippincott | 241/95 |
| 1,077,482 | 11/1913 | Lippincott | 241/95 |
| 2,627,377 | 2/1953 | Fletcher | 241/95 X |

Primary Examiner—Robert L. Spruill
Attorney—Holman & Stern

[57] ABSTRACT

A device for making shavings of ice by rotating a chunk of ice on the bottom of a cylindrical container so as to shave the ice with a knife fixed to a holder at the bottom. The ice shaver has a rotary shaft provided with a screw-threaded portion and adapted to drive an ice pressing disk for rotating a chunk of ice in engagement therewith while pushing the disk downward, with a half nut being disposed in a rotary shaft supporting portion, and an operation lever for causing the half nut to engage with or disengage from the threaded portion of the rotary shaft.

5 Claims, 9 Drawing Figures

ICE SHAVER

BACKGROUND OF THE INVENTION

The present invention relates to an ice shaver, more particularly to a household device for shaving a chunk of ice to make ice shavings.

An ice shaving device is already known which comprises a cylindrical container and a knife fixed to a holder disposed at the bottom of a container. With such device, a chunk of ice of a suitable size placed in the container is rotated and shaved by the knife to produce shavings of ice. In accordance with this type of device, a handle attached to the upper end of a rotary shaft is rotated while the shaft is being pushed downward so that the chunk of ice caught by an ice pressing disk fixed to the lower end of the shaft is rotated on the knife holder in pressing engagement with the cutting edge of the knife. Consequently, the need to apply a relatively great force on the handle makes it difficult to conduct a smooth shaving operation. For this reason, it is desired to provide a device easy to operate, especially a device with a handle which is operable with little effort.

SUMMARY OF THE INVENTION

An object of the present invention is to provide an ice shaver which can be operated without the application of downward pressure on the handle and which is therefore easy to operate for smooth shaving.

The present invention provides an ice shaver comprising a cylindrical container provided with a knife holder disposed at its bottom and having a knife whose cutting edge is positioned along a radial line and projected upward, a rotary shaft extending vertically through the center of a cover detachably fixed to the upper edge of the container and supported on the cover in vertically movable manner, a handle fixed to the upper end of the rotary shaft for rotating the rotary shaft manually, and an ice pressing disk fixed to the lower end of the rotary shaft for catching and rotating a chunk of ice placed in the container, with the present device being characterized in that the rotary shaft is provided with a screw-threaded portion for permitting the rotary shaft to move downward at a rate suitable for the knife to shave the ice, the cover being provided with a rotary shaft supporting portion incorporating a half nut adapted to be selectively engaged with the threaded portion of the rotary shaft, the structure further including an operation lever for moving the half nut toward or away from the threaded portion of the rotary shaft to cause the half nut to engage with or disengage from the threaded portion.

In accordance with an embodiment of the present invention, the operation lever is disposed in a portion of the cover for supporting the rotary shaft so as to be moved back and forth pivotally about the rotary shaft. Projecting from the operation lever symmetrically with respect to the rotary shaft are two pins which are inserted into cam grooves formed in the half nut. The cam grooves are formed in such a manner that forward pivotal movement of the lever causes the half nut to move forward into engagement with the threaded portion of the rotary shaft while the operation lever, when moved backward, disengages the half nut from the threaded portion.

When the handle is turned in the positive direction while the half nut is set in engagement with the threaded portion of the rotary shaft upon the forward movement of the operation lever, the rotary shaft is gradually lowered at a rate in accordance with the pitch of the screw threads. This allows the ice pressing disk to move progressively downward while rotating a chunk of ice, so that the ice is shaved by the cutting edge of the knife. Since the pressure for shaving ice is afforded by the progress of the threaded portion of the rotary shaft, the user has only to apply a torque to the handle. The pitch of the screw threads in the rotary shaft may preferably be as small as possible, because the ice will then be cut off in very thin layers to produce shavings of extremely small coarseness. Thus, an exceedingly smooth shaving operation is insured without applying downward pressure on the handle during rotating, and hence a very easy operation.

To move the ice pressing disk upward, the lever is pivotally moved backward, whereupon the half nut is disengaged from the threaded portion and retracted. It is now possible to pull up the rotary shaft without a need to rotate the rotary shaft.

Other objects and features of the present invention will become more apparent from the following description of embodiments.

DESCRIPTION OF THE PREFERRED EMBODIMENTS

Figure 1:
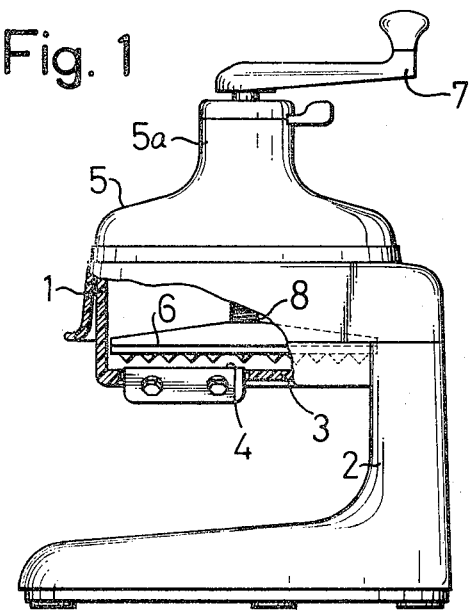
FIG. 1 is a front view partly broken away and showing an ice shaver embodying the present invention.

Referring to FIG. 1, designated at 1 is a cylindrical container supported on a suitable support 2 and provided with a knife holder 3 at the bottom. Fixed to the knife holder 3 is a knife 4 whose cutting edge extends radially from its center and is positioned above the upper surface of the knife holder 3 so as to shave a chunk of ice (not shown), placed in the container 1, from its bottom face. Designated at 5 is a cover for closing the upper opening of the container 1. The cover 5 is adapted to be detachably mounted on the container 1 by means of screw threads, helicoid or the like.

Figure 2:
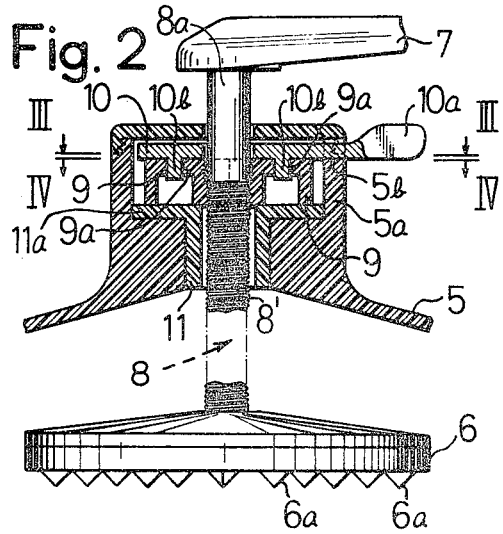
FIG. 2 is an enlarged view in vertical section showing the principal part of FIG. 1.
Figure 3:
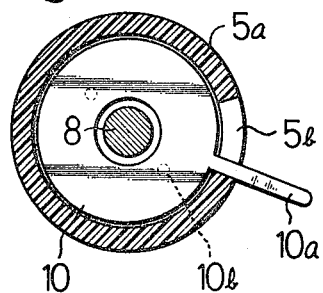
FIGS. 3 and 4 are plan views in cross section taken respectively along the lines III — III and IV — IV in FIG. 2, the views looking in the direction of the arrows.

As shown in FIG. 2, an ice pressing disk 6 is provided with a suitable number of claws or protuberances 6a projecting from its under surface. A handle 7 is fixed to the upper end of a rotary shaft 8 and adapted to rotate, by way of the shaft 8, the ice pressing disk 6 secured to the lower end of the shaft 8. The rotary shaft 8 extends vertically through a supporting portion 5a at the center of the cover 5 and is supported thereon in vertically movable manner.

Figure 4:
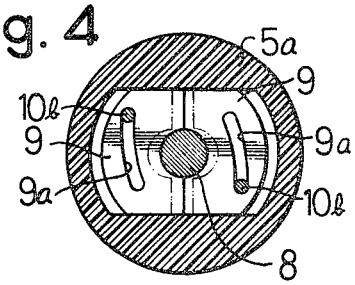

In the structure described above, the rotary shaft 8 is provided, as seen in FIG. 2, with screw threads 8' having a pitch suitable for shaving a chunk of ice. A half nut 9 is disposed in the supporting portion 5a of the cover 5. It will be seen in FIGS. 2 and 4 that the half nut 9 mounted in the supporting portion 5a has its opposite sides removed so as to be moved only toward and away from the rotary shaft 8. Such forward and backward movements of the half nut 9 are achieved by moving an operation lever 10 back and forth pivotally. To effect the reciprocal pivotal movement about the rotary shaft 8, the operation lever 10 has an operating portion or finger 10a which extends outward through a opening 5b formed in the side wall of the supporting portion 5a. Furthermore, the lever 10 has pins 10b positioned symmetrically with respect to the rotary shaft 8. The pins 10b are respectively inserted into cam grooves 9a each formed in each of the two parts constituting the half nut 9. As shown in greater detail in FIG. 4, the cam groove 9a is in the shape of arcuate groove, with one end close to the rotary shaft 8, and the other end away from the shaft 8. The operation lever 10, when pivotally moved forward, causes the half nut 9 to engage with the threaded portion 8' of the rotary shaft 8, and when the lever 10 is moved backward, the half nut 9 is retracted from the threaded portion. Although not shown, stop means such as a click stop may preferably be provided for the reciprocal pivotal movement of the lever 10. Also mounted in the supporting portion 5a is a bushing 11 with a flange 11a at its upper end whose top surface provides a plane for the half nut 9 to slide on. A cap 12 is in screw-thread engagement with the open end of the supporting portion 5a, with the cap serving to retain the half nut 9 and lever 10 within the supporting portion 5a. Preferably, the rotary shaft 8 may be provided with a straight or unthreaded portion 8a extending over a suitable length at an upper portion and having a slightly smaller diameter than the groove of the thread. In the case where the rotary shaft 8 is formed in such shape, the handle 7 will be prevented from clamping engagement with the upper face of the cap 12 when the rotary shaft is allowed to rotate idly upon finishing an ice shaving operation.

Figure 5:
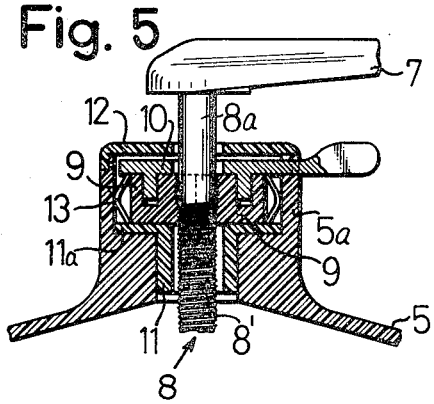

FIG. 5 shows an embodiment in which the half nut 9 is adapted to be urged toward the rotary shaft 8 by springs 13, the arrangement being such that as the operation lever 10 is pivotally moved forward, the springs 13 push the half nut 9 forward, while during the backward movement of the lever 10 the springs 13 are biased. The springs serve to insure meshing engagement between the half nut 9 and the threaded portion 8' of the rotary shaft 8.

Figure 6:
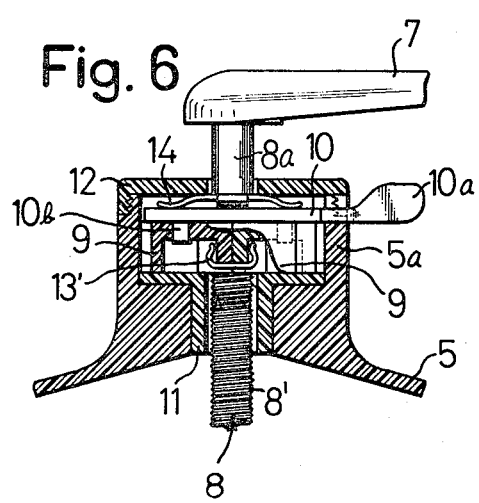
FIGS. 5 and 6 are views in vertical section respectively showing modified embodiments of the part illustrated in FIG. 2.

Instead of employing the springs 13, a U-shaped spring 13' as shown in FIG. 6 may alternatively be used and which pinches the two parts of half nut 9 on the opposite sides of the split surfaces to urge them against the rotary shaft 8.

A plate spring 14 shown in FIG. 6 acts to press the half nut 9 elastically against the bottom face of the supporting portion (i.e., against the face of flange of the bushing in the figure). Accordingly, if the knife is loaded to excess during shaving operation, the rotary shaft 8 is allowed to move up to such an extent that the action of the plate spring 14 permits, thereby mitigating the pressure on the chunk of ice temporarily. Thus, provision of the plate spring 14 enables the knife to cut off ice nearly in a uniform thickness without producing coarse broken pieces of ice, with a smooth shaving operation being insured in accordance with the state of the knife and conditions of ice.

Figure 7:
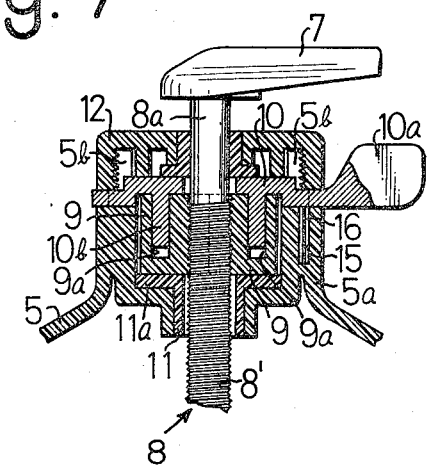
FIGS. 7 and 8 are views showing the principal part of another embodiment, the views being a vertical section and a plan view.
Figure 8:
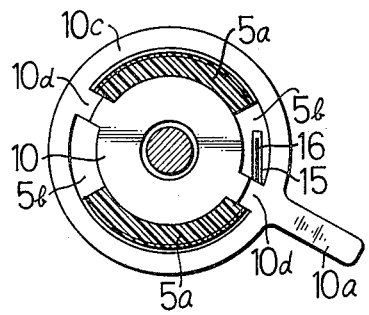
Figure 9:
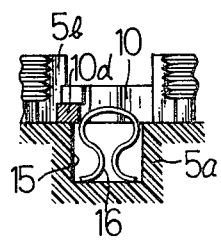
FIG. 9 is a view in vertical section showing the shape of a spring employed in the embodiment shown in FIGS. 7 and 8.

FIGS. 7 to 9 show another embodiment in which the pivotal movement of the operation lever 10, when made, can be sensed or ascertained by the operator. The lever 10 is provided with a ring 10c surrounding the supporting portion 5a and integrally jointed with the main portion of the lever by connectors 10d. On the other hand, openings 5b are formed symmetrically in the opposite sides of the supporting portion 5a. Formed in one of the openings 5b in its bottom is a groove 15 extending circumferentially or tangentially of the portion 5a. A Ω-shaped spring 16 is inserted in the groove 15 with its upper portion projected from the bottom surface of the openings 5b. The operation lever 10 is fitted into the supporting portion 5a, with the connectors 10d positioned in the openings 5b so that the lever 10 can be turned an angle which is defined by the openings 5b. When the cap 12 is fixed to the supporting portion 5a in screw-thread engagement therewith, the connectors 10d of the lever 10 are pressed against the spring 16. The spring 16, being bent as shown in FIG. 9, imparts resistance to the lever 10 as it is moved rightward or leftward, with the result that the user can sense the movement of the lever 10 as in the case of click stop.

The structure described above may further be modified. For instance, an embodiment may comprise a spring of greater elasticity adapted to prevent rightward or leftward pivotal movement of the operation lever 10 and means for relieving the action of the spring every time the lever is operated.

The fact that the rightward or leftward pivotal movement of the operation lever 10 can be sensed and ascertained completely precludes a situation in which the half nut is not fully in meshing engagement with the threaded portion to thereby prevent wear of the threads and serve to make the parts more durable.

We claim:

1. In an ice shaver comprising a cylindrical container having a bottom and an upper edge, a cover detachably fixed to the upper edge, a knife holder disposed at the bottom and having a knife, said knife having a cutting edge is positioned along a radial line and projected upward, a rotary shaft extending vertically through the center of the cover and supported on said cover in vertically movable manner, a handle attached to the shaft for rotating said rotary shaft manually, and an ice pressing disk fixed to the lower end of said rotary shaft for catching and rotating a chunk of ice placed in said container, the improvement comprising a screw-threaded portion on said rotary shaft for permitting said rotary shaft to move downward at a rate suitable for said knife to shave the chunk of ice, said cover having a rotary shaft supporting portion, a half nut located in said rotary shaft supporting portion, said half nut including two complemental parts movable toward each other to engage said screw-threaded portion and away from each other to disengage said screw-threaded portion, each part having an upper surface provided with an arcuate groove, and an operation lever for moving said parts toward or away from each other, said lever having two pins positioned symmetrically with respect to said shaft, with a pin being positioned in each arcuate groove so upon movement of the lever in one direction the pins and grooves coact to cause said parts, to engage with said screw-threaded portion while movement of the lever in a second direction causes the pins and grooves to coact to move said parts away from each other to disengage said screw-threaded portion.

2. The ice shaver as claimed in claim 1 including a plate spring for elastically pressing said half nut downward mounted in said rotary shaft supporting portion and bearing upon said operation lever.

3. The ice shaver as claimed in claim 1 including a spring located within said rotary shaft supporting portion bearing against a face of each part remote from the rotary shaft for urging said half nut toward said rotary shaft.

4. The ice shaver as claimed in claim 1 wherein said rotary shaft is provided at an upper portion with a straight smooth portion having a slightly smaller diameter than the diameter of the grooves of its threaded portion.

5. The ice shaver as claimed in claim 1 including a spring cooperable with the operation lever for sensing the direction of movement of said operation lever in the manner of a click stop.

* * * * *